United States Patent
Blair et al.

(10) Patent No.: US 10,229,454 B2
(45) Date of Patent: Mar. 12, 2019

(54) PROCESS OF AND APPARATUS FOR NOTIFICATION OF FINANCIAL DOCUMENTS AND THE LIKE

(75) Inventors: Andrew Blair, Sydney (AU); James Robert Hancock, Wahroonga (AU); Geoffrey Charles Purcell, East Hawthorn (AU); Robin James Beauchamp, Lane Cove (AU)

(73) Assignee: JAGWOOD PTY LTD., Roseville, NWS (AU)

( * ) Notice: Subject to any disclaimer, the term of this patent is extended or adjusted under 35 U.S.C. 154(b) by 115 days.

(21) Appl. No.: 12/515,813

(22) PCT Filed: Nov. 23, 2007

(86) PCT No.: PCT/AU2007/001802
§ 371 (c)(1),
(2), (4) Date: Nov. 5, 2009

(87) PCT Pub. No.: WO2008/061316
PCT Pub. Date: May 29, 2008

(65) Prior Publication Data
US 2010/0057578 A1    Mar. 4, 2010

(30) Foreign Application Priority Data

Nov. 23, 2006   (AU) ............................. 2006906552

(51) Int. Cl.
| | | |
|---|---|---|
| *G06F 8/65* | (2018.01) | |
| *G06Q 40/02* | (2012.01) | |
| *G06Q 20/10* | (2012.01) | |
| *G06Q 20/20* | (2012.01) | |
| *G06Q 20/40* | (2012.01) | |

(52) U.S. Cl.
CPC ............. *G06Q 40/02* (2013.01); *G06Q 20/10* (2013.01); *G06Q 20/20* (2013.01); *G06Q 20/40* (2013.01)

(58) Field of Classification Search
CPC ................................ H04L 12/56; H04L 47/10
USPC ...................................... 705/16, 40
See application file for complete search history.

(56) References Cited

U.S. PATENT DOCUMENTS

| | | | |
|---|---|---|---|
| 5,121,945 A * | 6/1992 | Thomson ........... | B42D 15/0053 15/53 |
| 6,957,224 B1 | 10/2005 | Megiddo et al. | |
| 2003/0014745 A1* | 1/2003 | Mah ......................... | G06F 8/65 717/170 |
| 2003/0028616 A1* | 2/2003 | Aoki ....................... | H04L 47/10 709/217 |
| 2004/0125402 A1 | 7/2004 | Kanai et al. | |

(Continued)

FOREIGN PATENT DOCUMENTS

| | | |
|---|---|---|
| EP | 1589451 A1 | 10/2005 |
| JP | 2004259196 A | 9/2004 |
| JP | 2005276007 A | 10/2005 |

*Primary Examiner* — Talia F Crawley
(74) *Attorney, Agent, or Firm* — Volpe and Koenig, P.C.

(57) ABSTRACT

A payee sends a financial document such as an invoice to a payer via a payment adviser service. The payer sends a financial document such as an advice of payment to the payment adviser service and instructions for payment to a payment clearance system. The payment clearance system sends to the payee information on where to access the financial document by including it in the payee's bank statement.

72 Claims, 11 Drawing Sheets

(56) References Cited

U.S. PATENT DOCUMENTS

| | | | |
|---|---|---|---|
| 2005/0021464 A1* | 1/2005 | Lindauer | G06Q 20/10 705/40 |
| 2006/0015459 A1 | 1/2006 | Enenkiel | |
| 2007/0136193 A1* | 6/2007 | Starr | G06Q 20/105 705/41 |
| 2009/0265211 A1* | 10/2009 | May | G06Q 20/02 705/18 |
| 2010/0153273 A1* | 6/2010 | Sellars et al. | 705/67 |

* cited by examiner

| | |
|---|---|
| Payment Adviser | |
| Home Document upload | |
| Contents  Sign Up  Help | |
| File attachment | c:/findoc/Jane13Jan.doc |
| Document Reference | www.p.aa/123456789 |
| Target Account | |
| Payment System | Australian Banking System |
| BSB | 123127 |
| Account Name | Jane Purcy |
| Account Number | 7879099 |
| Shared Secret | |
| Question | Enter your mobile number |
| Answer | 0402 071 359 |
| Sender's Description | Distribution statement for January 2006 |
| | OK |

Figure 7.

|  | TAX Invoice |
|---|---|
|  | XYZ Pty Limited |
|  | 40 Arthur Street |
|  | Rodd Point NSW 2046 |
|  | A.B.N. 114 971 210 |

Date: 07/06/2006
Invoice No: 178787989

To:
John Smith - ABC Pty Ltd
ACN 097 553 690
28 Plaza St.
Wimble , 3066, Victoria

| Quantity | Description of Supply | Value | Total |
|---|---|---|---|
| 4 days | Consulting services | $1200 per day | $4800 |
|  | GST |  | $480 |
|  | TOTAL AMOUNT PAYABLE |  | $5280 |

Please pay invoice to the following bank account:
BSB 123-127
Account: 7879099
Name: XYZ
Use payment reference: www.p.aa/178787989

Please send financial statement either to:
Email: jane.purcy178787989@p.aa
Fax: 02 8753 0672
URL: www.a.aa/upload/ jane.purcy /178787989

For inquiries, please contact:
Jane Purcy
Mobile: 0402 071 359

Figure 11.

Document Upload Web Service

Input fields

Document Reference: www.p.aa/123456789

Target Account

- Payment System: Australian Banking System
- BSB: 123127
- Account Name: Jane Purcy
- Account Number: 7879099

Shared Secret

- Question: Enter your fly buys number
- Answer: 1676789

Sender's Description: Sales docket for goods purchased

Document content:
```
David Jones

Date: 17/10/2006

Docket number: 98989

Goods:
  Durban suit 104          $1200
  GATT Business suit        $400
  GST                       $160
Total:                     $1760
```

Output fields

- Return Code:
- Description:

PROCESS OF AND APPARATUS FOR NOTIFICATION OF FINANCIAL DOCUMENTS AND THE LIKE

FIELD OF THE INVENTION

The present invention relates the communication of financial documents between the parties to financial transactions.

BACKGROUND OF THE INVENTION

FIG. 1 is a block diagram of a known approach 1000 to issuing financial documents with payments. According to this known approach, an electronic payment 80 and a financial document 45 (such as an advice of payment) are sent between a payer and payee. The financial document 45 will often be created at process 40 by the payer to provide details of the payment. This financial document is often sent such as by postal mail or by email 50 to the payee.

When the financial document has been created, the payer creates a payment instruction using an in-house application 60 or banking application 70. This payment instruction is sent to the payer financial institution 90 as an electronic payment file 80, and if the payer has sufficient funds, a payment is sent by 90 to the payee financial institution 300 and deposited in the payee's bank account.

The payee can view the payment on their bank statement using their banking application 310 or by viewing paper statements issued by the payee's financial institution.

When the financial document 45 is received by the payee, the payee opens the financial document and will try to match the details (eg. date, payment amount, payer name) with details on the bank statement 315.

A major limitation with this common approach is the financial document 45 and the electronic payment 80 can arrive at the payee at different times, and the payee has the difficult task of matching 320 the financial document to the payment on their bank statement. Matching can be difficult because the payment details on bank statements are often limited to a few fields such as: payment amount, payment description / reference, remitter name, payment date, debit and credit indicator. Such few fields that are permitted by industry standard electronic payment clearance systems, such as clearance system 100, inherently define a limited communication bandwidth for the electronic payments 80 through which they are processed. This limited bandwidth of the conventional electronic payment clearance system 100 has resulted in the separate communication of an electronic payment 80 and the related financial document 25 illustrated in FIG. 1 and the aforementioned mismatching problems associated therewith.

SUMMARY OF THE INVENTION

In contrast, according to one aspect, the present invention provides, in a system which includes:
a payer;
a payee; and
a payments clearance system which includes a payer's financial institution and a payee's financial institution,
a process comprising,
providing a payments adviser system; and
the payer sending
to the payee via the payments clearance system:
a payment; and
an identifier that signifies to the payee the location to access a financial document; and
the financial document to the location that is signified by the identifier.

According to another aspect, the present invention provides, in a system which includes:
a payer;
a payee; and
a payments clearance system which includes a payer's financial institution and a payee's financial institution,
a process comprising:
providing a payments adviser system; and
the payee sending
to the payer's financial institution through the payments clearance system:
a request for a payment; and
an identifier that signifies to the payer the location to access a financial document; and
the financial document to the location that is signified by the identifier According to another aspect, the present invention provides a process of a payee:
sending to a payer's financial institution through a payments clearance system:
a request for a payment; and
an identifier that signifies to the payer the location to access a financial document; and
sending that financial document to the location that is signified by the identifier.

Other aspects of the invention are summarized in the claims that appear at the end of this specification

BRIEF DESCRIPTION OF THE DRAWINGS

In order that the present invention may be more readily understood, preferred embodiments of it are described with reference to the drawings.

FIG. 4 is an example screen design for a preferred embodiment of the document upload screen.

FIG. 7 illustrates a document which can be created according to preferred embodiments of the present invention.

FIG. 11 is an example screen design for a preferred embodiment of the input and output fields.

DESCRIPTION OF PREFERRED EMBODIMENTS OF THE INVENTION

Figure 2:
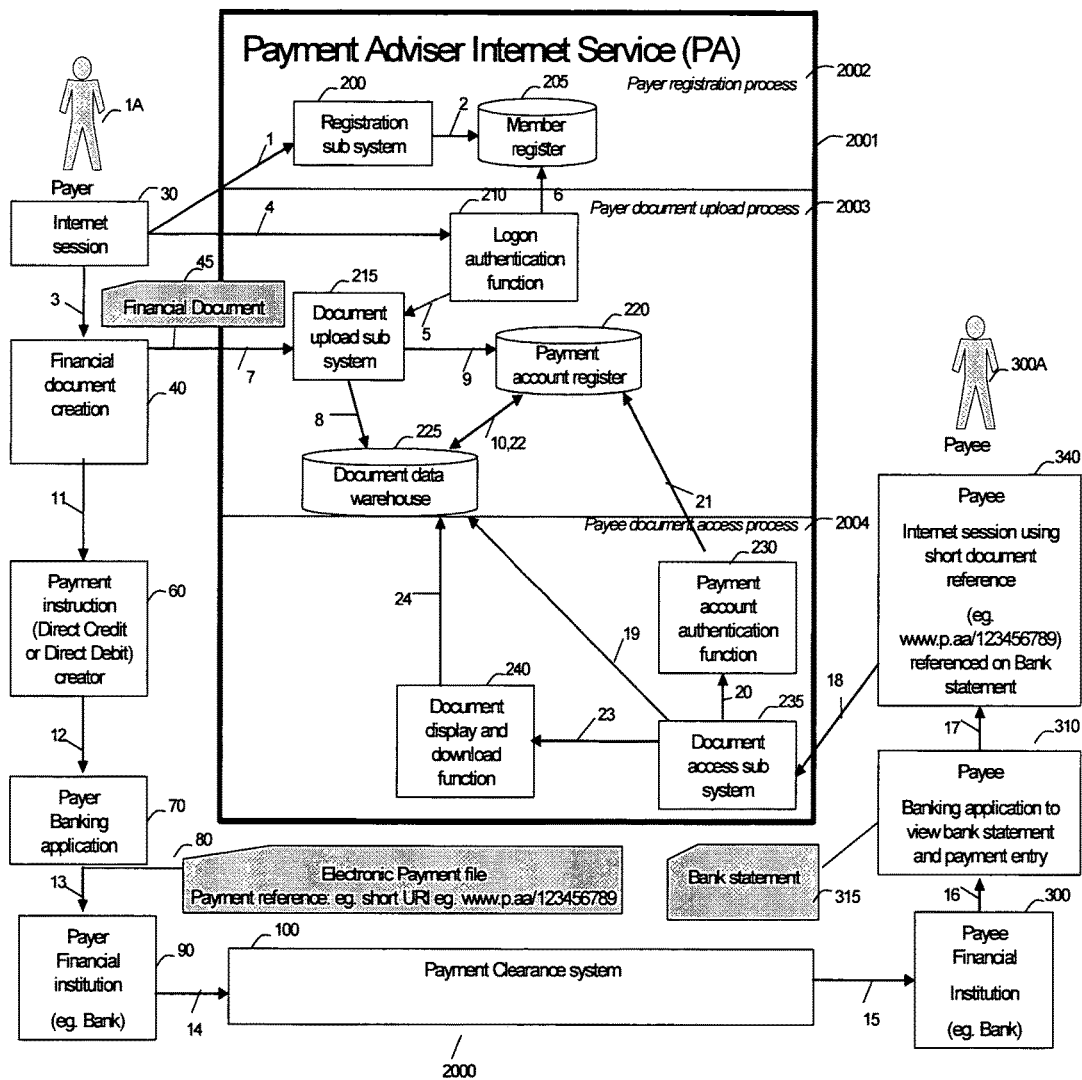
FIG. 2 is a block diagram illustrating a system for issuing electronic payments according to a first embodiment of the present invention.

FIG. 2 illustrates a system 2000 according to one preferred embodiment of the present invention.

The system 2000 includes a payment adviser Internet service 2001. The payment adviser Internet service 2001 includes a payer registration process 2002, a payer document and upload process 2003 and a payee document access process 2004.

The payer registration process 2002 has a registration sub-system 200 and utilizes a member register 205.

The payer document upload process includes a logon authentication function 210, a document upload sub-system 215, and utilizes a payment account register 220 and a document data warehouse 225.

The payee document access process has a document access sub-system 235, payment account authentication function 230, and a document display and download function 240.

As will now be described, the embodiment of the invention illustrated in FIG. 2 is used, among other things, to allow a payee to access financial documents that have been generated by, or on behalf of the payer.

According to this embodiment, the payer first registers as a member of the payment adviser Internet service 2001 using the registration sub-system 200. The payer member details and authentication details (eg. login and password) are stored in the member register 205.

When the payer 1A wants to send a payment with a financial document 45 to a payee 300A, the payer 1A first creates the financial document 45 using an application 40. Preferred forms of application 40 include commercial accounting packages and word processing applications. The payer 1A then uploads the financial document 45 using the document upload sub-system 215. Examples of the financial document 45 include a document image, a document produced by a word processor program, or a electronic document file containing tagged data values.

The document upload sub-system 215 offers a variety of ways to upload a file. A preferred mechanism is for the payer to login onto the payment adviser Internet service 2001 using the login authentication function 210, and to use a document upload screen which allows the Payer to attach the financial document for upload into the payment adviser Internet service. A preferred embodiment of a document upload screen is illustrated in FIG. 4. For each financial document 45, the payer is required to specify the following:

a payment account details of the payee
  security authentication information
  document reference code.

The payment account details are used to uniquely identify the payee's financial institution account which will receive payment from the payer. The details which are needed to uniquely identify a payee's account can vary between national payment clearance systems. For example in Australia, a payment bank account is uniquely identified by a BSB and an account number.

The payer 1A can specify the type of security authentication which needs to be satisfied before the payee can access a document it is preferred that the security authentication is a combination of the following:

payment account details (mandatory),
  document reference code (mandatory),
  payment date,
  payment amount, and
  shared secret between the payer and payee.

A document reference code is a short reference which is used to access the financial document, and is placed as a field in an electronic payment file 80 so that it appears on the payee's bank statement. Preferred fields for placement of the document reference code are the lodgment e reference field or the remitter name field. By placing the document reference code in one of such existing field of the electronic payment file 80, the electronic payment and the code are communicated within the inherent limited communication bandwidth of the conventional electronic payment clearance system 100.

A preferred form of the document reference code 80 is a short Uniform Resource Identifier (URI) which describes the mechanism to access the resource (ie. financial document), the computer on which the resource is housed (ie. payment adviser Internet service), and the specific name of the resource. For this example implementation, the short URI would have the format:

www.p.aa/123456789.

the first part is a web address which identifies the location of the payment adviser Internet service: for example: www.p.aa. The second part is a document id which is less than or equal to 10 characters in length: for example: 123456789. This identifies the name of the financial document.

When the financial document 45 is successfully uploaded into the payment adviser Internet service 2001 by the document upload sub-system 215, the sub-system 215 will load the content of the document, security authorization details and document reference details into the document data warehouse 225. The payee's payment account details are also loaded into the payment account register 220, and these account details are linked to the 45 details in the document data warehouse.

After the financial document 45 has been uploaded into the payment adviser Internet service 2001, the payer then creates a direct credit payment instruction for the financial document 45 using an application 60 such as an accounting package or using the payer's banking application 70. When creating the payment instruction, the payer is required to enter the document reference code in a payment field of the payment. Examples of the payment reference field include the lodgment reference field Dr remitter name field. The field selected needs to be a field which will show on the payee's bank statement.

The electronic payment file 80, containing the payment instruction, is electronically issued to the payer's financial institution 90 for processing. The electronic payment file 80 can be issued to the financial institution 90 using either the application 80 or the payer's banking application 70. The payer financial institution 90 will process the electronic payment file 80 and if there are sufficient funds in the payer's 1A account the institution 90 will send the payment to the payee's financial institution 300.

For the payee 300A to access the financial document 45 which the payer has uploaded into the payment adviser Internet service 2001, the payee 300A needs to access their bank statement 315. A payee could use a desktop bank application 310 to view and download their bank statement. Alternately the payee could request their financial institution 300 for paper copies of the bank statement 315.

On viewing their bank statement 315, the payee 300A extracts the document reference code (eg. implemented as a short URI document reference, such as www.p.aa/123456789) in the payment reference field for the deposit payment issued by the payer.

Preferred embodiments of this invention also allow for the document reference code to appear on the bank statement associated with the payer's bank account. The payer's financial institution 90 will place the document reference code in a payment reference field associated with the withdrawal details of the payment made to the payee. An example payment reference field is the lodgment reference field. This will enable the payer to access the financial document 45 from the payer's bank statement, using the document reference code.

The payee 300A opens an Internet session 340, and enters (or copies) in the Internet browser the document reference code which is specified in the payment reference field of the bank statement 315.

Figure 5:
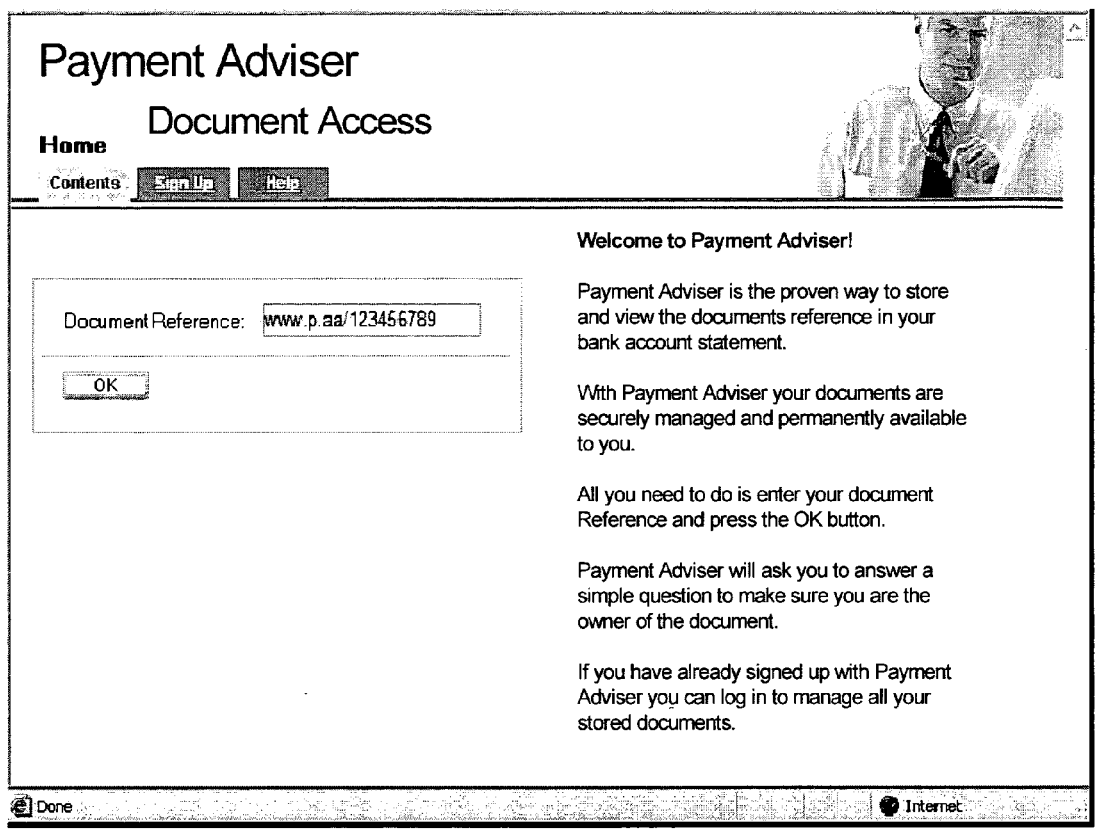
FIG. 5 is an example screen design for a preferred embodiment of the document access screen of the payment advisor Internet service.

When the payment adviser Internet service 2001 receives a request for the document reference (eg. URI) with the document id (eg. 123456789), that service 2001 will execute the document access sub-system 235, and will display the document access screen. FIG. 5 illustrates a preferred embodiment of the document access screen.

The user 300A is permitted to enter for the document reference the full document reference (eg. the URI www.p.aa/123456789) or the document id (eg. 123456789).

When the "ok" button of the document access screen of FIG. 5 is selected, the document access sub-system 235 will attempt to validate that the document reference exists by checking that the document reference code exists in the document data warehouse 225.

Figure 6:
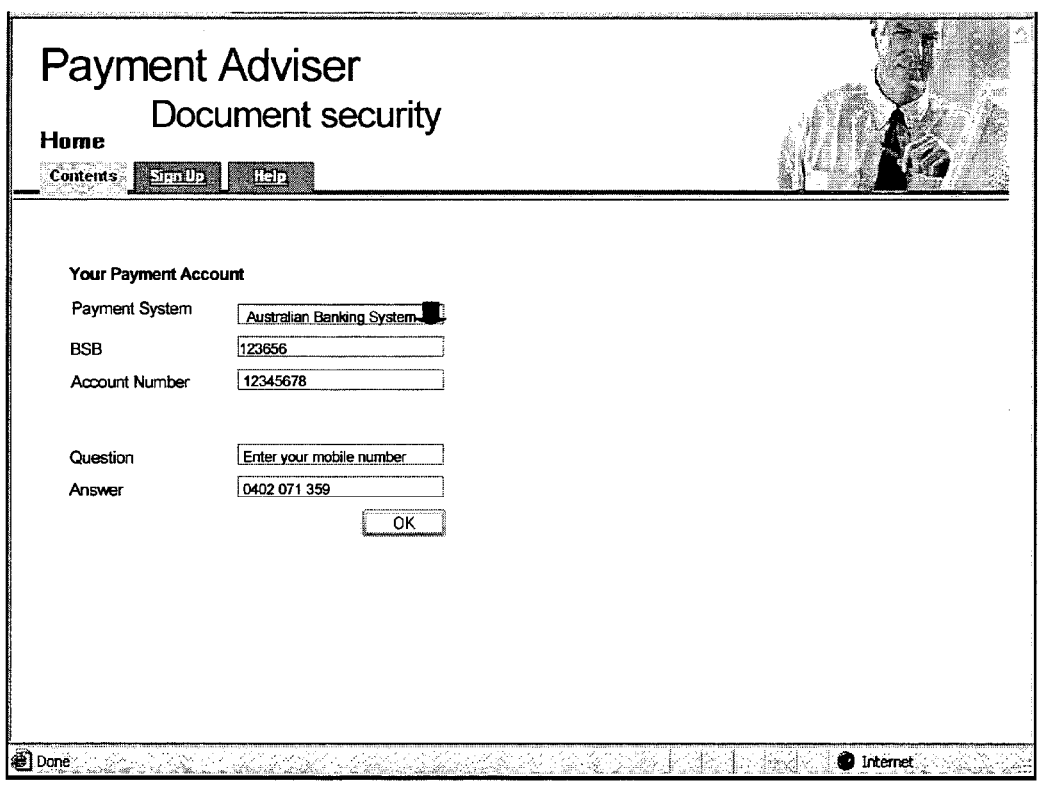
FIG. 6 is an example screen design for a preferred embodiment of the document security screen of the payment advisor Internet service.

If the document reference is valid, the document access sub-system 235 will display to the payee a document security Internet screen. A preferred embodiment of the document security Internet screen is shown in FIG. 6. This screen will prompt the payee to enter their payment account details, and if requested by the payer, will be required to enter other details such as a shared secret, payment amount or payment date.

When the payee presses the ok button on the document security Internet screen, the document access sub-system 235 will pass the entered security details to the payment account authentication function 230. The payment account authentication function 230 will query the payment account register 220 to verify that there are financial documents associated with the payment account and other security details entered (eg. shared secret). The payment account register 220 will search for the payment account details, and will query the document data warehouse 225 to see if there are any financial documents associated with the payment account which have the same document reference as entered on the document access screen. If a financial document does exist, the payment account register 220 will verify that the other security details match the security details associated with the financial document.

The results of the search are passed from the payment account register 220 back to the document access sub-system 235.

If there are no documents which match the search, then an error message is displayed to the payee on the document security screen.

If the payment account register 220 determines that there are one or multiple documents associated with the document reference and security details, then the document access sub-system 235 will call the document display and download function 240 to retrieve the documents. These documents will be passed to the document access sub-system 235.

If there are multiple documents, the document access sub-system 235 will list the multiple documents and display the list to the payee in the document display screen. The payee will be able to select and view any of the documents which are listed.

If there is a single document associated with the document reference and authenticated user, the document access sub-system 235 will display the document to the payee in the document display screen.

The embodiment of the invention described above is of an embodiment in which the payment instruction is a direct credit payment instruction to deposit money into a payee's bank account. This embodiment also allows for the payment instruction to be a direct debit payment instruction, whereby the instruction is to withdraw money. The Payer 1A shown in FIG. 2 is not a payer if they issue a direct debit payment instruction to the other party 300A. The party 1A will follow the same process described above for sending a financial document 45 and payment instruction 80 to the party 300A, and the party 300A will follow the same process outlined above for access the financial document. The key difference with issuing a direct debit payment instruction, compared with a direct credit payment instruction, is that the financial institution 90 will issue a payment request to financial institution 300 to withdraw money from payee 300A bank account.

As will be seen from the description above, embodiments of the present invention allow a payee to easily access the financial document 45 sent by a payer. The financial document 45 is electronically submitted to the payment adviser Internet system 2001, and the payee can access this document by using a short document reference code which the payer has provided as part of the electronic payment file 80 and which subsequently appears on the payee's bank statement.

Figure 1:
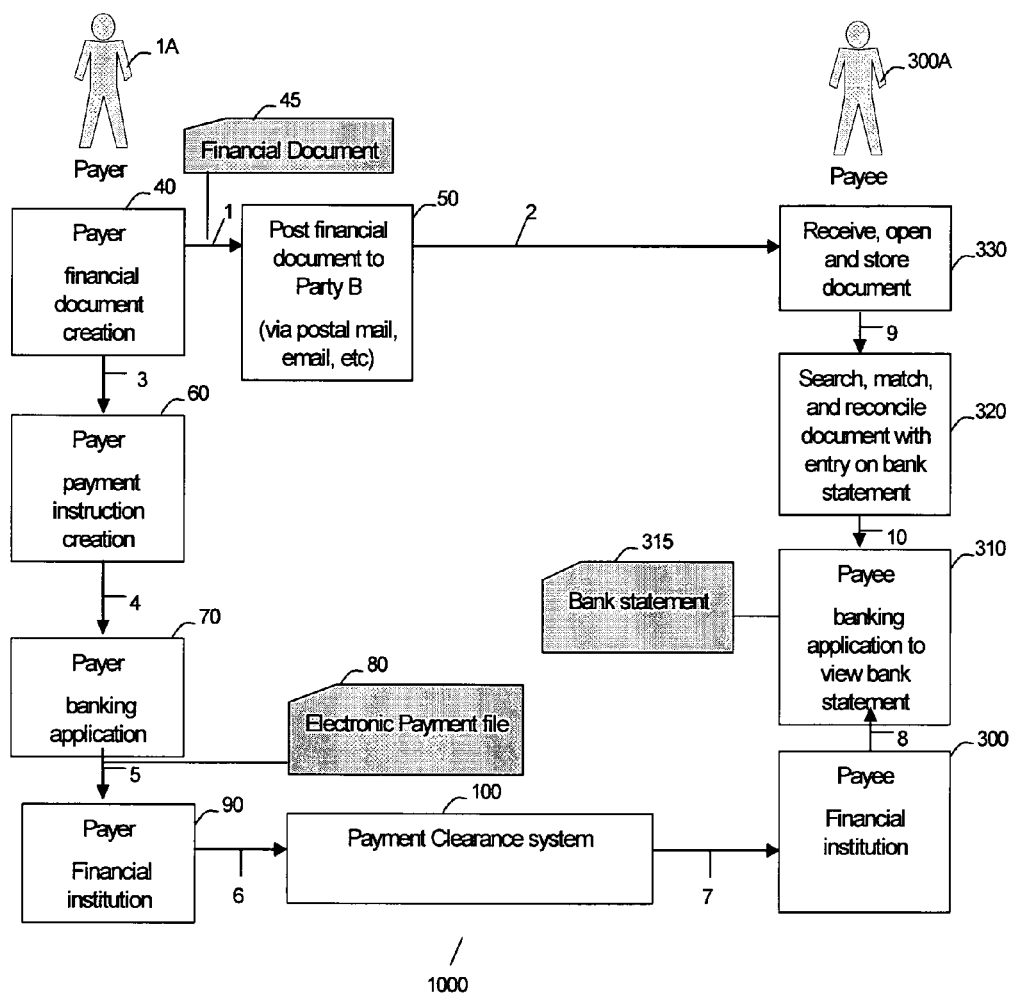
FIG. 1 is a block diagram of a known approach to issuing financial documents with payments.

Compared with the common approach in FIG. 1, the embodiments of the present invention remove the need by the payer to post a financial document 50, and for the payee to have to search and match 320 the financial document with a payment on the bank statement.

Figure 3:
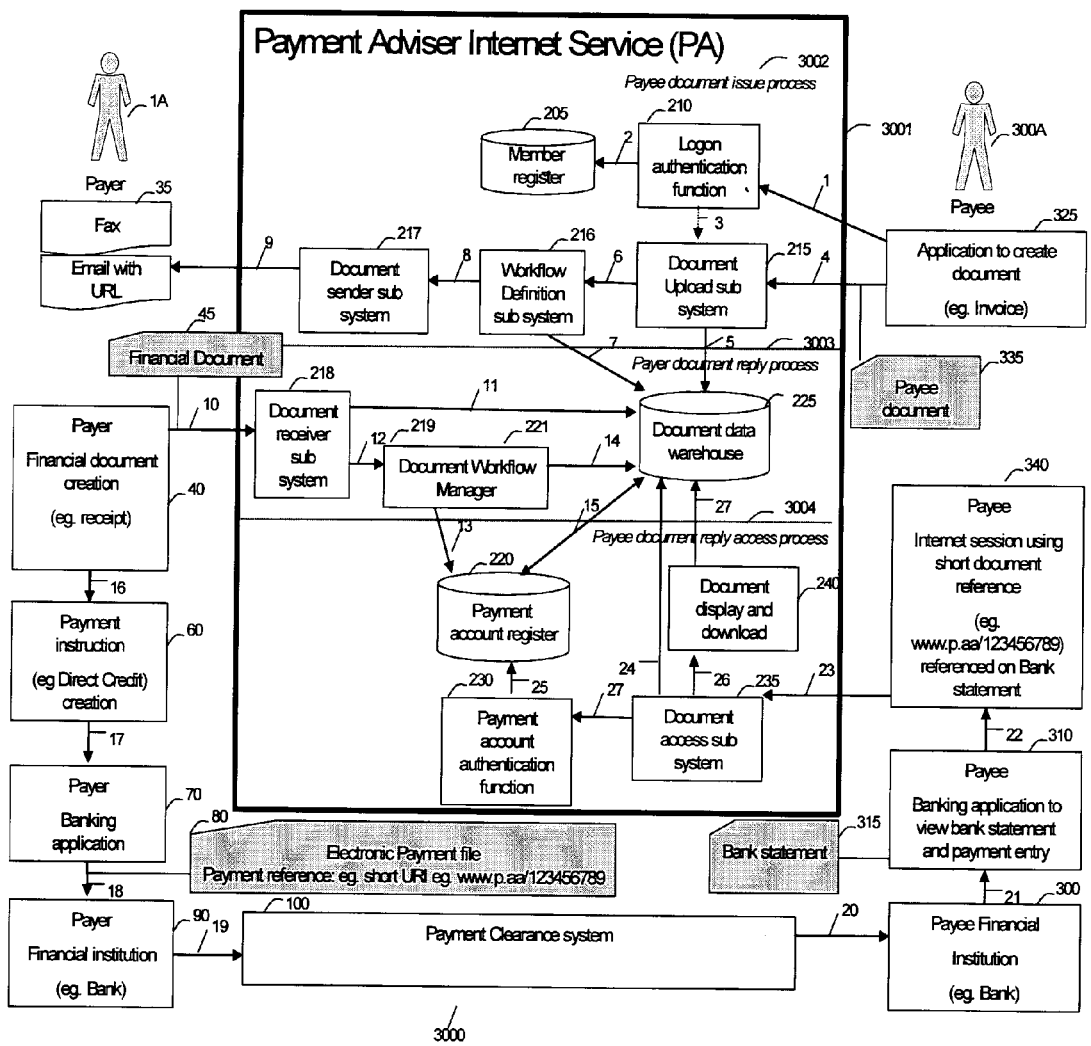
FIG. 3 is a block diagram illustrating a system for issuing electronic Payments according to a second embodiment of the present invention.

FIG. 3 illustrates further embodiments 3001 of the payment adviser Internet service which allow the integration of documents sent between a payee and payer with the payment that is issued by a payer to a payee.

When the payee 300A needs to send a document 335 (eg. an invoice) to a payer 1A, the payee first creates the document 335 using an application 325—such as a commercial accounting package or a word processing application. The payee 300A then uploads the document 335 using the document upload sub-system 215. The financial document 335 uploaded could be a document image, or could be an electronic document file containing tagged data values.

The document upload sub-system 215 offers a variety of ways to upload a financial document 335. One approach is for the payee to login to the payment adviser Internet service 3001 using the login authentication function 210, and to use the document upload Internet screen which allows the payee to attach the document 335 for upload into the payment adviser Internet service 3001. To login, the pays is required to register as a member of the payment adviser Internet service 3001. The registration process follows the same process as he payer registration pros shown in FIG. 2.

FIG. 4 illustrates a preferred embodiment of the document upload screen. For the financial document 335, the payee 300A is required to specify the following:
  security authentication information,
  document reference, and
  default payee payment account (optional).

The payee 300A can specify the type of security authentication which needs to be satisfied before the payer 1A can access payee document 335. It is preferred that security authentication is a combination of the following:
  email address of payer 1A;
  something that is known to both the payer 1A and the
    payee 300A, examples of which can include:

the payer's mobile telephone number,
the payer's car registration number, or
the payer's account number—issued prior by the payee.

The document reference code is a short reference which uniquely identifies the payee document from other documents which the payee 300A has previously uploaded to the payment adviser Internet service 3001. This document reference code is used to link the documents sent between the payee 300A and the payer 1A and the payment which the payer 1A sends to the payee 300A.

An example implementation of the document reference code is a short Uniform Resource Identifier (URI) which describes the mechanism to access the resource (ie. financial document), the computer that the resource is housed (ie. payment adviser Internet service), and the specific name of the resource. The format of this short URI was described previously above.

When the document 335 is successfully uploaded into the payment adviser Internet service 3001 by the document upload sub-system 215, that sub-system will toad the content of the document 335, security authentication details and document reference details into the document data warehouse 225.

The payment adviser Internet service 3001 will then execute the workflow definition sub-system 216 which will display the document workflow screen to allow the payee 300A to specify:

The transport medium and addresses which will be used to send to the payer 1A a document 335. The transport medium could include, email, fax, sms, etc. For each transport medium chosen the payee is required to enter the address of the payer. For example if the email transport is selected, then the payee will be required to enter the email address of the payer.

The "return" transport medium and addresses which can be used by the payer 1A to submit the responding financial document 45. Example transport channels include an email address, fax number or a URI to upload a financial document 45. The URI contains the web address of PA the payment adviser Internet service 300, the resource name of the document receiver sub-system 218, and a unique reference to identify the document 355.

For each "return" transport address, the payee 300A can specify where the return document 45 is to be stored and whether it is to be linked to document 335 in the document data warehouse 255.

Figure 8:
FIG. 8 is an example screen design for a preferred embodiment of the document workflow screen.

A preferred embodiment of the document workflow screen is shown in FIG. 8. When the payee 300A completes the document workflow screen and presses ok, the workflow definition sub-system 216 will store the workflow details in the document data warehouse 225 with the details of the document which has been uploaded. The workflow definition sub-system 216 will also create and activate the return addresses which the payee has nominated. For example, the workflow definition sub-system 216 will create and activate the return email address which the payee has specified in the document workflow screen.

The payment adviser Internet service 3001 will then execute the document sender sub-system 217 which will send document 335 to the payer addresses specified in the document workflow screen. FIG. 7 illustrates an embodiment of a document 335 which could be sent to a payer 1A.

On receiving a document 335, the payer 1A can respond by first creating a financial document 45 using a application 40—such as an commercial accounting package or a word processing application. The financial document 45 will contain details of a payment—in response to receiving document 335 from the payee.

Once the financial document 45 has been created, the payer 1A can send the document to the payee 300A using one of the return addresses which the payee 300A has specified in the document. One common approach will be to use the URI link which the payee 300A has provided. The payer 1A will be required to open an Internet session, and to enter the URI address which has been provided by the payee 300A.

When the URI link is specified by the payer 1A in an Internet session, this will initiate the payment adviser Internet service 3001 to invoke the document receiver sub-system 218 which will use the URI to retrieve from the document data warehouse 225 the security authentication requirements which the payee 30GA has specified. If there are security authentication requirements then the document receiver sub-system 218 will display a document upload security screen requesting security details.

Figure 9:
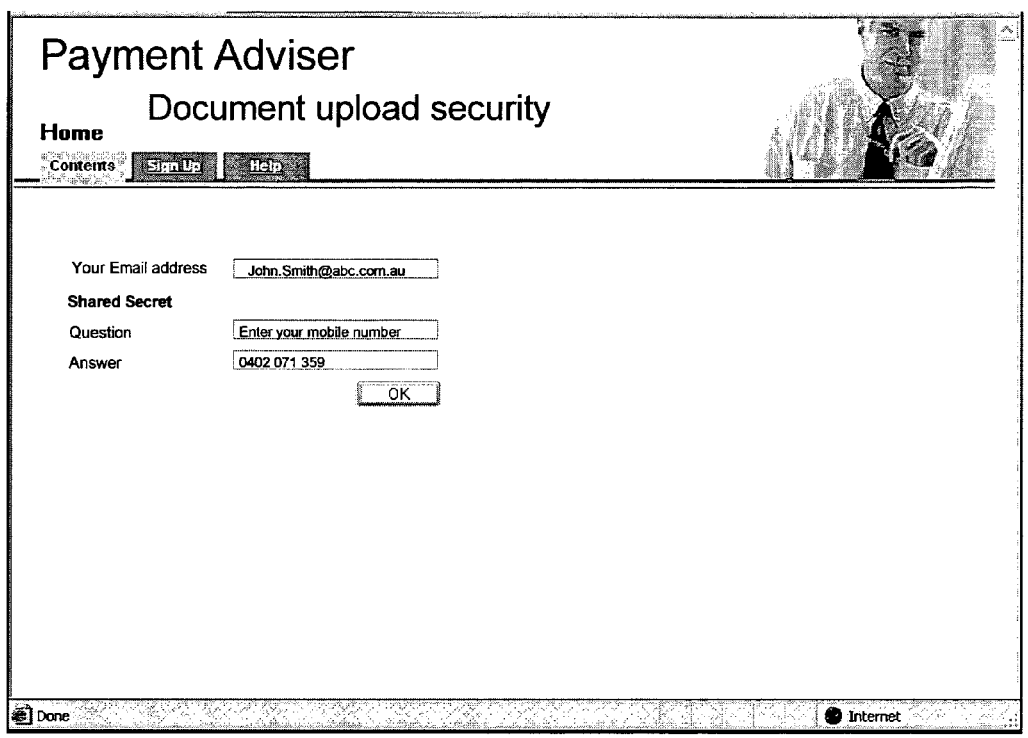
FIG. 9 is an example screen design for a preferred embodiment of the document upload security screen.

A preferred embodiment of the document upload security screen is illustrated in FIG. 9. If the payer 1A enters the security details which match the required authentication details, then the document upload screen illustrated in FIG. 4 will be displayed to the payer 1A. For the financial document 45, the payer is required to specify the following:
payment account details of the payee
security authentication details
document reference code—which should be the same as the document reference code for the payee document 335.

The payment account details are used to uniquely identify the payee's 300A account which will receive payment from the payer 1A. The details which are needed to uniquely identify a payee's 300A account can vary between national payment clearance systems. For example in Australia, a payment bank account is uniquely identified by a BSB and an account number.

The payer 1A can specify the type of security authentication which needs to be satisfied before the payee 300A can access a document. It is preferred that the security authentication is a combination of the following:
payment account details (mandatory);
document reference code (mandatory);
payment date;
payment amount; and
shared secret between the payer 1A and the payee 300A.

The payer 1A then uploads the financial document using the document upload sub-system 215. The financial document 45 could be a document image, a document produced by a word processor program, or it could be an electronic document file containing tagged data values.

When the financial document 45 is successfully uploaded, the document receiver sub-system 218 will execute the document workflow manager 219 which will load the content of the document 45, security authentication details and document reference details into the document data warehouse 225. The payee's payment account details are also loaded into the payment account register 220, and these account details are linked to the details of the financial document 45 in the document data warehouse.

The document receiver sub-system 218 will extract from the document data warehouse 225 the workflow actions which the payee has specified for document 335 and for each return transport address. The document receiver sub-system 218 will execute the workflow actions associated with the transport address which has been used for sending document 45 to the payment adviser Internet service 3001 (eg URI).

For example, one of the workflow actions might be to link document 45 to document 335 in the data warehouse so that the payee can easily view both documents together.

After the financial document 45 has been uploaded into the payment adviser Internet service 3001, the payer then creates a direct credit payment instruction for each financial document using an application 60 such as an accounting package or using the payer's banking application 70. When creating the payment instruction, the payer 1A is required to enter the document reference code of financial document 45 in a payment field of the payment instruction. Examples of the payment reference field include the lodgment reference field or remitter name field. The field selected needs to be a field which will show on the payee's bank statement 315.

The electronic payment file 80, containing the payment instruction, is electronically issued to the payer's financial institution 90 for processing. The electronic payment file 80 can be issued to the payer's financial institution 90 using either the in-house application 60 or the banking application 70. The payer's financial institution 90 will process the electronic payment file and if the payer 1A has sufficient funds in his/her bank account will send the payment to the payee's financial institution 300.

For the payee 300A to access the financial document 45 which the payer has uploaded into the payment adviser Internet service 3001, the payee 300A needs to access their bank statement. Alternatively, the payee can login onto the payment adviser Internet service 3001 and view both the payer document 335 and the financial document 45 because both documents will be linked in the payment adviser Internet service 3001—if requested by the payee 300A in the document workflow screen. A payee 300A could use a desktop bank application 310 to view and download their bank statement 315. Alternatively the payee could request their financial institution for paper copies of the bank statement. 315

When the payee 300A views their bank statement 315, the payee extracts the document reference code (eg. implemented as a short URI document reference, such as www.p.aa/123456789) in the payment reference field for the deposit payment issued by the payer 1A.

The payee 300A opens an Internet session 340, and enters (or copies) in the Internet browser the document reference code which is specified in the payment reference field of the bank statement 315.

When the payment adviser Internet service 3001 receives a request for the document reference (eg. URI) with the document id (eg. 123456789), it will execute the document access sub-system 235, and will display the document access screen. FIG. 5 shows the payment adviser Internet service 3001 document access screen which is displayed.

The payee 300A is permitted to enter for the document reference the full document reference code (eg. the URI www.p.aa/123456789) or the document id (eg. 123456789).

When the "ok" button is selected, the document access sub-system 235 will attempt to validate that the document reference exists by checking that the document reference code exists in the document data warehouse 225.

If the document reference is valid, the document access sub-system 235 will display to the payee a "document security" Internet screen which is shown in FIG. 6. This screen will prompt the payee 300A to enter their payment account details, and if requested by the payer 1A, will be required to enter other details such as a shared secret, payment amount or payment date.

When the payee 300A presses the ok button on the "document security" Internet screen, the document access sub-system 235 will pass the entered security details to the payment account authentication function 230. The payment authentication function 230 will query the payment account register 220 to verify that there are financial documents associated with the payment account and other security details entered (eg. shared secret). The payment account register 220 will search for the payment account details, and will query the document data warehouse to see if there are any financial documents associated with the payment account and have the same document reference as entered on the document access screen. If a financial document does exist, the payment account register 220 will verify that the other security details match the security details associated with the financial document.

The results of the search are passed from the payment account register 220 back to the document access sub-system 235.

If there are no documents which match the search, then an error message is displayed to the payee 300A on the "document security" screen.

If the payment account register 220 determines that there are one or multiple documents associated with the document reference and security details, then the document access sub-system 235 will call the document display and download function 240 to retrieve the documents. These documents will be passed to the document access sub-system 235.

If there are multiple documents, 235 will list the multiple documents and display the list to the payee in the document display screen. The payee will be able to select and view any of the documents which are listed.

If there is a single document associated with the document reference and authenticated user, 235 will display the document to the payee in the document display screen.

Figure 10:
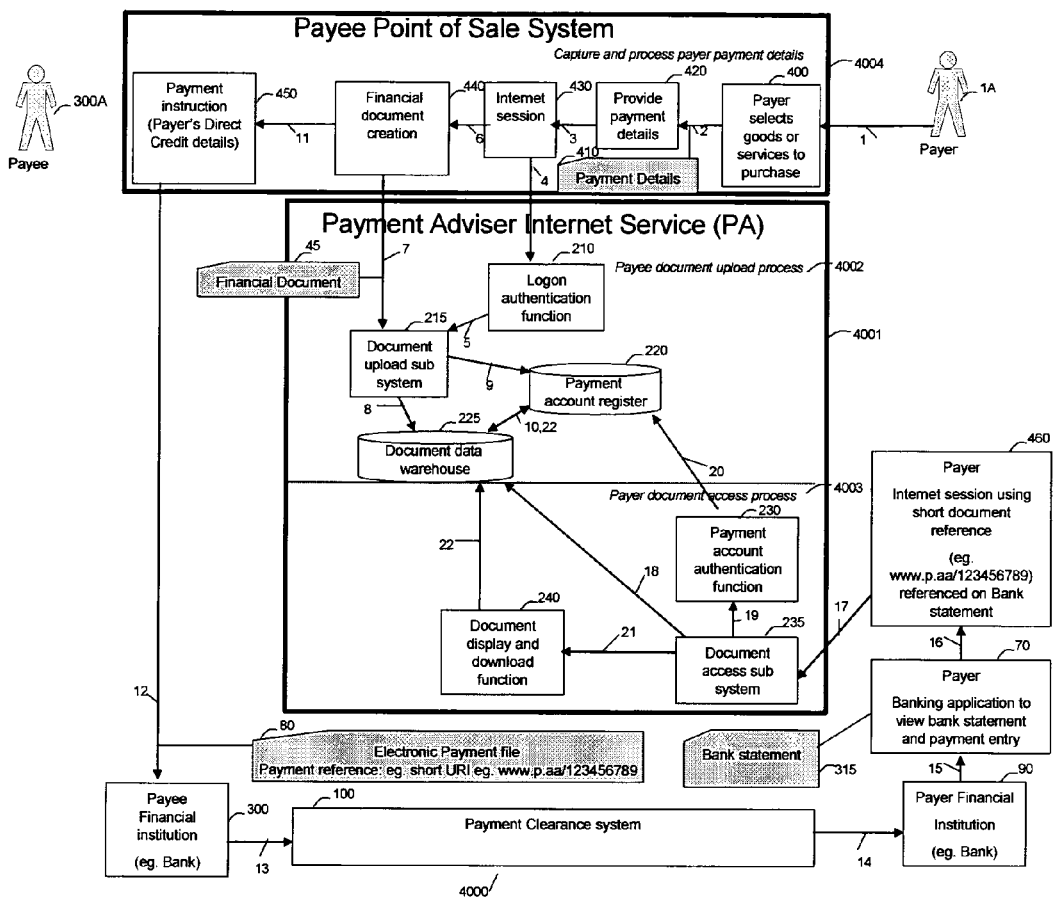
FIG. 10 is a block diagram illustrating a system for issuing electronic payments according to a third embodiment of the present invention.

FIG. 10 illustrates a system 4000 according to one preferred embodiment of the present invention.

The system 4000 includes a payment adviser Internet service 4001. The payment adviser Internet service 4001 includes a payee document and upload process 4002 and a payer document access process 4003.

The payee document upload process includes a logon authentication function 210, a document upload sub-system 215, and utilizes a payment account register 220 and a document data warehouse 225.

The payer document access process has a document access sub-system 235, payment account authentication function 230, and a document display and download function 240.

According to this embodiment the payer first chooses goods or services to purchase from a payee 300A. The payer then provides to the payee payment details for the purchase of the goods and services. Examples of payment details could be Visa credit card payment details, or bank direct credit account details. The payment details 410 are entered into payee's point of sale system 4004. The details could be entered using such devices such as Electronic Funds Transfer at Point of Sale (ETPOS), a payment facility on an Internet site provided by the payee, or the like 420.

When the payment details 410 are entered, the payee's point of sale system 4004 will execute the financial document creation function 440. This function will create a financial document 45 that provides details of the payment transaction, and will upload the financial document into the payment adviser Internet service 4001. Examples of the financial document 45 include a document image, an electronic document file containing tagged data values, or the like.

As described in the previous embodiments, the document upload sub-system 215 offers a variety of ways to upload a file. A preferred mechanism is for the payee's point of sale system 4004 to log onto the payment adviser Internet service 4001 using a web service (or the like) associated with the login authentication function 210. The web service will authenticate the payee's point of sale system, and will establish a secure Internet session between the point of sale system 4004 and the payment adviser Internet service 4001. Note, to log onto the payment adviser Internet service 4001, the payee is required to register as a member of the payment adviser Internet service 4001. The registration process follows the same process as the payer registration process shown in FIG. 2.

The point of sale system will then execute the web service (or the like) associated with the document upload sub-system 215, to upload the financial document. A preferred embodiment of the input and output fields of the document upload web service is illustrated in FIG. 11. For each financial document 45, the payee's point of sale system is required to provide the following:
  payment account details of the payer,
  security authentication information,
  document reference code, and
  document content.

The payment account details are used to uniquely identify the payer's financial institution account. The details which are needed to uniquely identify a payer's account can vary between national payment clearance systems. For example in Australia, a payment bank account is uniquely identified by a BSB and an account number.

The payee's point of sale system 4004 can specify the type of security authentication which needs to be satisfied before the payer can access a document. It is preferred that the security authentication is a combination of the following:
  payment account details (mandatory),
  document reference code (mandatory),
  payment date,
  payment amount, or
  shared secret between the payer and payee.

A document reference code is a short reference which is used to access the financial document, and is placed as a field in an electronic payment file 80 so that it appears on the payer's bank statement (and payee's bank statement). Preferred fields for placement of the document reference code are the lodgment reference field or the remitter name field.

A preferred form of the document reference code 80 is a short Uniform Resource Identifier (URI) which describes the mechanism to access the resource (ie. financial document), the computer on which the resource is housed (ie. payment adviser Internet service), and the specific name of the resource. The format of this short URI was described previously above.

When the financial document 45 is successfully uploaded into the payment adviser Internet service 2001 by the document upload sub-system 215, the sub-system 215 will load the content of the document, security authorization details and document reference details into the document data warehouse 225. The payer's payment account details are also loaded into the payment account register 220, and these account details are linked to the 45 details in the document data warehouse.

After the financial document 45 has been uploaded into the payment adviser Internet service 2001, the payee's point of sale system will execute the payment instruction function 450. This function will create a direct credit payment instruction for the payer's payment details 410. When creating the payment instruction, the payee's paint of sale system enters the document reference code in a payment field of the payment. Examples of the payment reference field include the lodgment reference field or remitter name field. The field selected needs to be a field which will show on the payer's bank statement.

The electronic payment file 80, containing the payment instruction, is electronically issued to the payee's financial institution 300 for processing. The payee's financial institution 300 will process the electronic payment file 80, and issue the payment instruction to the payer's financial institution 90 which will deduct the payment from the payer's bank account, if the payer has sufficient funds. The payment will be sent by the financial institution 90 to the payee's financial institution 300, and deposited in the payee's bank account.

For the payer 1A to access the financial document 45 which the payee has uploaded into the payment adviser Internet service 4001, the payer 1A needs to access their bank statement 315. A payer could use a desktop bank application 70 to view and download their bank statement. Alternately the payer could request their financial institution 90 for paper copies of the bank statement 315.

Preferred embodiments of this invention also allow for the document reference code to appear on the bank statement associated with the payee's bank account. The payee's financial institution will place the document reference code in a payment reference field associated with the deposit details of the payment made by the payer. An example payment reference field is the lodgment reference field. This will enable the payee to access the financial document 45, using the document reference code.

On viewing their bank statement 315, the payer 1A extracts the document reference code (eq. implemented as a short URI document reference, such as www.p.aa/123456789) in the payment reference field for the deposit payment issued by the payee. The payer 1A opens an Internet session 460, and enters (or copies) in the Internet browser the document reference code which is specified in the payment reference field of the bank statement 315.

When the payment adviser Internet service 4001 receives a request for the document reference (eg. URI) with the document id (eg. 123456789), that service 4001 will execute the document access sub-system 235, and will display the document access screen. FIG. 5 illustrates a preferred embodiment of the document access screen.

The payer 1A is permitted to enter for the document reference the full document reference (eg. the URI www.p.aa/123456789) or the document id (eg. 123456789).

When the "ok" button of the document access screen of FIG. 5 is selected, the document access sub-system 235 will attempt to validate that the document reference exists by checking that the document reference code exists in the document data warehouse 225.

If the document reference is valid, the document access sub-system 235 will display to the payer a document security Internet screen A preferred embodiment of the document security Internet screen is shown in FIG. 6. This screen will prompt the payer to enter their payment account details, and if requested by the payer, will be required to enter other details such as a shared secret, payment amount or payment date.

When the payer presses the ok button on the document security Internet screen, the document access sub-system 235 will pass the entered security details to the payment account authentication function 230. The payment account authentication function 230 will query the payment account register 220 to verify that there are financial documents associated with the payment account and other security details entered (eg. shared secret). The payment account register 220 will search for the payment account details, and will query the document data warehouse 225 to see if there are any financial documents associated with the payment account which have the same document reference as entered on the document access screen. If a financial document does exist, the payment account register 220 will verify that the other security details match the security details associated with the financial document.

The results of the search are passed from the payment account register 220 back to the document access sub-system 235.

If there are no documents which match the search, then an error message is displayed to the payee on the document security screen.

If the payment account register 920 determines that there are one or multiple documents associated with the document reference and security details, then the document access sub-system 235 will call the document display and download function 240 to retrieve the documents. These documents will be passed to the document access sub-system 235.

If there are multiple documents, the document access sub-system 235 will list the multiple documents and display the list to the payer in the document display screen. The payer will be able to select and view any of the documents which are listed.

If there is a single document associated with the document reference and authenticated user, the document access sub-system 235 will display the document to the payer in the document display screen.

The embodiments of the present invention removes the need by the payee to post a financial document 45 to the payer, and for the payer to have to search and match the financial document 45 with a payment on the bank statement 315.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

Comprises/comprising when used in this specification is taken to sty the presence of stated features, integers, steps or components but does not preclude the presence or addition of one or more other features, integers, steps, components or groups thereof.

The claims defining the invention are as follows:

1. A process for transferring payment information from a payer's computer system to a payee's computer system in conjunction with an electronic payment from the payer to the payee via a secure payment clearance system in connection with:
    a payments adviser computer system comprising computer software executing on computer hardware remote from the computer systems of the payer and payee and communicable over the internet, and
    a payments clearance computer system comprising computer software executing on computer hardware remote from the computer systems of the payer and payee and which hardware includes a payer's financial institution's computer system and a payee's financial institution's computer system, the process comprising:
    the payer preparing a financial document in electronic form relating to a proposed payment instruction describing how the payment is to be applied by the payee and storing it on the payer's computer system ready for upload,
    the payer's computer system sending a request over the internet to the payments adviser computer system for an identifier for the financial document;
    in response to the request, the payment adviser system allocating the identifier for the financial document, the identifier being allocated as a short uniform resource identifier (URI) comprising:
        (a) the internet address of the payments adviser computer system and a unique location for the financial document, and
        (b) a character length within an available character limit imposed by the payments clearance computer system to be used by the payer's financial institution's computer system;
    the payer's computer system at or after the time of the request, uploading over the internet the financial document to the payments adviser computer system for storage per the identifier;
    the payer's computer system sending to the payer's financial institution's computer system for sending to the payee's computer system through the payments clearance computer system:
        a payment request corresponding to the financial document; and
        a payment reference containing or consisting of the identifier and which signifies to the payee the location to access the financial document;
    on authorization of the electronic payment request, the payer's financial institution's computer system sending via the payments clearance computer system to the payee's financial institution's computer system:
        the payment; and
        the payment reference containing or consisting of the identifier and which signifies to the payee the location to access the financial document;
    the payments clearance computer system sending to the payee's financial institution's computer system:
        the payment; and
        the payment reference containing or consisting of the identifier and which signifies to the payee the location to access the financial document;
    the payee's financial institution's computer system creating a payment advice or bank statement accessible to the payee containing information received via the payments clearance computer system from the payer's financial institution's computer system including the identifier, and
    the payee's computer system sending a request over the internet to the payment adviser system which includes the identifier to access the stored financial document applicable to the payment received by the payee from the payer.

2. The process as claimed in claim 1 in which the payer's computer system supplies security authentication information to the payments adviser computer system.

3. The process as claimed in claim 2 in which the security authentication information includes at least payment account details of the payee.

4. The process as claimed in claim 3 in which the payee's computer system uses the identifier to access the financial document.

5. The process as claimed in claim 4, in which the payee's computer system is allowed access to the financial document only on the production of security authentication information to the payments adviser system.

6. The process as claimed in claim 5, in which the security authentication information comprises the payee's payment account details and the identifier.

7. The process as claimed in claim 5, in which the security authentication information further comprises at least one of:
the payment date;
the payment amount; and
a secret shared secret between the payer and payee.

8. The process as claimed in claim 5, in which payer registration is required with the payments adviser computer system before the payer's computer system sends the request over the internet to the payments adviser system for the identifier for the financial document.

9. The process as claimed in claim 8, in which the payer registration requires the payer to establish a password which is to be used whenever the payer requests a document identifier.

10. The process as claimed in claim 1, further comprising, before the payment is sent to the payee's computer system through the payments clearance computer system, the payee's computer system sending the financial document to the payer.

11. The process as claimed in claim 10, wherein in lieu of the payer's computer system requesting the identifier and uploading the financial document, the process comprises the further steps of:
the payee's computer system sending a request over the internet to the payments adviser computer system for the identifier for the financial document;
the payments adviser computer system allocating the identifier to the payee in response to the request, the identifier being allocated a short uniform resource identifier (URI) having a character length within an available character limit imposed by the payments clearance computer system to be used by the payer's financial institution's computer system;
the payee's computer system uploading over the internet the financial document to the payments adviser computer system for storage per the identifier;
the payee's computer system sending to the payer:
a payment request; and
information including the document identifier, thereby allowing the payer's computer system to send over the internet to the payments adviser computer system the document identifier to access the stored financial document applicable to the payment request received by the payer's computer system from the payee's computer system.

12. The process as claimed in claim 10, in which the financial document that the payee's computer system uploads to the payments adviser computer system is an invoice.

13. The process as claimed in claim 12, in which the payer's computer system uses the identifier to access the financial document.

14. The process as claimed in claim 13, in which the payer's computer system is allowed access to the financial document only on the production of security authentication information to the payments adviser system.

15. The process as claimed in claim 14, in which the security authentication information comprises the payment account details and the identifier.

16. A computer system for allowing a payer having a payer's computer system to pay a payee having a payee's computer system as a financial transaction through a financial institution's computer system and securely providing the payee with access to a financial document relating to the financial transaction, the system comprising:
a payments adviser computer system remote from the payer's computer system and payee's computer system; and
at least one payments clearance computer system remote from the payer's computer system and payee's computer system comprising computer software executing on computer hardware, which hardware includes a payer's financial institution's computer system and a payee's financial institution's computer system;
the payments adviser computer system configured to receive from the payer's computer system a request over the internet for a document reference code for the financial document relating to a payment constructed by the payer's computer system;
the payments adviser computer system configured to allocate the document reference code to the payer's computer system in response to the request, the document reference code being allocated as a short uniform resource identifier (URI) having a character length within an available character limit imposed by the at least one payments clearance computer system to be used by the payer's financial institution's computer system;
the payments adviser system configured to receive from the payer's computer system, at or after the time of the request, an upload over the internet of the financial document for storage per the document reference code;
at the time of uploading the financial document, the payments adviser computer system being configured to receive from the payer's computer system (a) payment account details of the payee, and (b) security authentication information;
the at least one payments clearance computer system being further configured to:
process a payment instruction issued by the payer to the payer's financial institution's computer system that includes the amount to be transferred, the payment account details of the payee and the document reference code such that the document reference code appears in a transaction field in the documents received by the payee from the payee's financial institution's computer system;
process the payment instruction by debiting the payer's financial institution's computer system and crediting the payee's financial institution's computer system, such that the payee's financial institution's computer system provides to the payee details of the transaction including the document reference code;
be contacted by the payee via the internet using in the URI the document reference code; and
provide to the payee a copy of the uploaded financial document via the internet.

17. The computer system as claimed in claim 16 wherein the payments adviser computer system is configured to provide to the payee the uploaded copy only after entry of the security authentication information.

18. The computer system as claimed in claim 17 wherein the payments adviser computer system originates the document reference code.

19. In a system for a financial transaction between a payer and a payee which includes:

a payer's computer system operable by a payer, a payee's computer system operable by a payee;

a payments adviser computer system comprising computer software executing on computer hardware remote from the payer and payee and communicable over the internet; and a payments clearance computer system comprising computer software executing on computer hardware remote from the payer's computer system and payee's computer system and which hardware includes a payer's financial institution's computer system and a payee's financial institution's computer system;

a process comprising:

the payee sending by the payee's computer system over the internet to the payments adviser computer system a request for a document reference code for a financial document, the payments adviser computer system allocating a document reference code to the financial document in response to the request, the document reference code being allocated as a short uniform resource identifier (URI) having a character length within an available character limit imposed by the payments clearance computer system to be used by the payer's financial institution's computer system;

the payee's computer system at or after the time of the request, uploading over the internet the financial document to the payments adviser computer system for storage per the document reference code; and the payee sending by the payee's computer system to the payer's financial institution's computer system through the payments clearance system:

a request for a payment; and the document reference code that signifies to the payer the location to access the financial document.

20. The process as claimed in claim 19, in which: the payee's computer is a point of sale terminal.

21. The process as claimed in claim 20, in which:

the document reference code signifies a location within the payments adviser computer system; and the location to which the payee's computer system sends the financial document is that location within the payments adviser computer system.

22. The process as claimed in claim 21, in which the payments clearance computer system communicates the document reference code to the payer's computer system.

23. The process as claimed in claim 22, in which the payments clearance computer system communicates the document reference code to the payer's computer system by including it in the payer's bank statement.

24. The process as claimed in claim 23, in which the payments clearance computer system includes the document reference code in the payee's bank statement.

25. The process as claimed in in claim 24, in which the payee's computer system sends the financial document over the Internet.

26. The process as claimed in in claim 25, in which the payer uses the document reference code to access the financial document.

27. The process as claimed in claim 26, in which the payer is allowed access to the financial document only on the production of security authentication information to the payments adviser computer system.

28. The process as claimed in claim 27, in which the security authentication information comprises the payment account details and a document reference code.

29. The process as claimed in claim 28, in which the security authentication information further comprises at least one of:

the payment date;

the payment amount; and a secret shared secret between the payer and payee.

30. The process as claimed in in claim 29, further comprising, before the payee's computer system sends a request for payment to the payer's financial institution's computer system, the payee's computer system sends the financial document to the payer's computer system.

31. The process as claimed in claim 30, in which at least one of:

the payer's bank statement; and the payee's bank statement, includes the document reference code that signifies the location of the financial document that the payee's computer system sends to the payer's computer system.

32. The process as claimed in in claim 31, in which the financial document that the payee's computer system sends to the payer's computer system includes a document reference code that signifies a location of the request for payment that the payee's computer system sends to the payer's computer system.

33. The process as claimed in claim 32, in which the location of the request for a payment that the payee's computer system sends to the payer's computer system is within the payments adviser system.

34. The process as claimed in in claim 33, in which the financial document that the payee's computer system sends to the payer's computer system is an invoice.

35. A process in a system for use by a payer and a payee that each have a computer system, wherein the system comprises:

a payments adviser computer system comprising computer software executing on computer hardware remote from the payer's computer system and the payee's computer system and communicable over the internet; and a payments clearance computer system comprising computer software executing on computer hardware remote from the payer's computer system and payee's computer system and which hardware includes a payer's financial institution's computer system and a payee's financial institution's computer system, the process comprising:

in response to a request from the payer's computer system, the payment adviser computer system allocating an identifier for a financial document of the payer, the identifier being allocated as a short uniform resource identifier (URI) having a character length within an available character limit imposed by the payments clearance computer system;

the payments adviser system receiving an upload of the financial document from the payer's computer system at or after the time of the request and storing the financial document per the identifier;

the payments clearance computer system receiving from the payer's computer system a payment and a payment reference containing or consisting of the identifier which signifies a location to access the financial document;

the payments clearance computer system sending to the payee's financial institution's computer system a first payment advice containing information from the payer's financial institution's computer system including the identifier, thereby enabling the payee's financial institution's computer system to create a second payment advice or a bank statement accessible to the payee containing information from the first payment advice, thereby allowing the payee to provide the identifier to access the stored financial document.

36. The process as claimed in claim 35 in which the payer's computer system supplies security authentication information to the payments adviser computer system.

37. The process as claimed in claim 36 in which the security authentication information includes at least payment account details of the payee.

38. The process as claimed in claim 37, in which the payee is allowed access to the financial document only on the production of security authentication information to the payments adviser computer system.

39. The process as claimed in claim 38, in which the security authentication information further comprises at least one of:
the payment date;
the payment amount; and
a secret shared between the payer and payee.

40. The process as claimed in claim 39, comprising the further step of requiring the payer to register with the payments adviser computer system before requesting the identifier.

41. The process as claimed in claim 40, in which the payer registration requires the payer to establish a password which is to be used whenever the payer requests a document identifier.

42. The process as claimed in claim 41, further comprising, before the payer's computer system sends a payment to the payee's computer system through the payments clearance computer system, the payee's computer system sending a payee financial document to the payer's computer system.

43. The process as claimed in claim 42, wherein the process comprises the further steps of:
in response to a request from the payee's computer system, the payments adviser computer system providing a payee document identifier for the payee financial document, the payee document identifier being allocated a payee short uniform resource identifier (URI) having a character length within an available character limit imposed by the payments clearance computer system;
the payments adviser computer system receiving the payee financial document and storing the payee financial document against the payee document identifier;
the payee's computer system sending to the payer's computer system a request for payment and information including the payee document identifier, thereby allowing the payer's computer system to send over the internet to the payments adviser computer system the payee document identifier to access the stored payee financial document.

44. The process as claimed in claim 43, in which the payee financial document is an invoice.

45. The process as claimed in claim 44, wherein the payer's computer system uses the payee document identifier to access the payee financial document.

46. The process as claimed in claim 45, wherein the payer's computer system is allowed access to the payee financial document only on the production of security authentication information to the payments adviser computer system.

47. The process as claimed in claim 46, wherein the security authentication information comprises payment account details of the payer and the payee document identifier.

48. A computer system for allowing a payer to pay a payee as a financial transaction through a financial institution and providing the payee with means to access a financial document relating to the financial transaction, the system comprising:
a payments adviser computer system remote from the payer's computer system and payee's computer system; and
at least one payments clearance computer system remote from the payer's computer system and payee's computer system;
the payments adviser system being adapted to allocate a document reference code in response to a request from the payer's computer system for the document reference code for the financial document constructed by the payer's computer system, the document reference code being allocated as a short uniform resource identifier (URI) having a character length within an available character limit imposed by the payments clearance computer system;
the payments adviser computer system being adapted to receive the financial document from the payer's computer system at or after the time of the request and to store the financial document per the document reference code;
the payments adviser computer system being further adapted to receive from the payer's computer system:
(a) payment account details of the payee and
(b) security authentication information;
the at least one payments clearance computer system being further adapted to:
debit the payer's financial institution and crediting the payee's financial institution's computer system upon receiving confirmation that a payment instruction has been issued to the payer's financial institution's computer system including the amount to be transferred, the payment account details of the payee and the document reference code and that the payer's financial institution's computer system has processed the payment; and
to provide to the payee a copy of the uploaded financial document via the internet upon being contacted by the payee via the internet using the document reference code.

49. The computer system as claimed in claim 48 wherein the uploaded copy is provided to the payee only after entry of the security authentication information.

50. The computer system as claimed in claim 49, wherein the payments adviser computer system originates the document reference code.

51. The computer system as claimed in claim 50, wherein the available character limit imposed by the payments clearance computer system to be used by the payer's financial institution's computer system is no more than twenty (20) characters.

52. The process as claimed in claim 1, wherein the available character limit imposed by the payments clearance computer system to be used by the payer's financial institution's computer system is no more than twenty (20) characters.

53. The computer system as claimed in claim 16, wherein the available character limit imposed by the payments clearance computer system to be used by the payer's financial institution's computer system is no more than twenty (20) characters.

54. The process system as claimed in claim 19, wherein the available character limit imposed by the payments clearance computer system to be used by the payer's financial institution's computer system is no more than twenty (20) characters.

55. The process as claimed in claim 35, wherein the available character limit imposed by the payments clearance computer system to be used by the payer's financial institution's computer system is no more than twenty (20) characters.

56. A data processing system for transmitting payment advice data, the data processing system comprising:
   a payer's computer system operable by a payer having means for generating
      (a) a payment order to initiate a financial transaction via a financial institution's computer system to pay a payee, and
      (b) a financial document containing payment advice data;
   a payer financial institution's computer system;
   at least one payments clearance computer system remote from the payer and payee;
   a payee's financial institution computer system;
   a payee's computer system operable by a payee; and
   a payments adviser computer system remote from the payer and payee;
   the payments adviser computer system configured to receive from the payer a request over the internet for a document reference code for a financial document relating to a payment constructed by the payer;
   the payment adviser system configured to allocate the document reference code to the payer in response to the request, the document reference code being allocated as a short uniform resource identifier (URI) having a character length within an available character limit imposed by the payments clearance computer system to be used by the payer's financial institution's computer system;
   the payments adviser system configured to receive from the payer, at or after the time of the request, an upload over the internet of financial document to for storage per the document reference code;
   at the time of uploading the financial document, the payments adviser computer system configured to receive from the payer (i) payment account details of the payee and (ii) security authentication information;
   at least one payments clearance computer system configured to process a payment instruction issued by the payer to the payer's financial institution's computer system that includes the amount to be transferred, the payment account details of the payee and the document reference code such that the document reference code appears in a transaction field in the documents received by the payee from the payee's financial institution's computer system;
   the at least one payments clearance computer system configured to process the payment instruction by debiting the payer financial institution's computer system and crediting the payee financial institution's computer system, such that the payee financial institution's computer system provides to the payee details of the financial transaction including the document reference code;
   the payee computer system having means for requesting the financial document from the payments adviser computer system by sending a request via the internet using in the URI the document reference code for the financial document to the payments adviser computer system;
   wherein the payments adviser computer system uses the document reference code received from the payee computer system as a key to retrieve the financial document corresponding to the document reference code and requests the payee computer system to supply
      (i) the payment account details of the payee, and
      (ii) information corresponding to the security authentication information previously uploaded by the payer; and
   if the information received in response to these requests matches the information previously uploaded by the payer, then the payments adviser computer system transmits the financial document to the payee computer system.

57. A process for facilitating commerce by identifying a payment received by a payee from a payer performed in connection with:
   a payments adviser computer system comprising computer software executing on computer hardware remote from computer systems of the payer and payee and communicable over the internet, and
   a payments clearance computer system comprising computer software executing on computer hardware remote from the computer systems of the payer and payee and which hardware includes a payer's financial institution's computer system and a payee's financial institution's computer system,
   the process comprising:
   the payer's computer system generating a financial document containing payment information relevant to the payee and sending a request over the internet to the payments adviser computer system for an identifier for the financial document;
   the payment adviser system allocating the identifier to the financial document in response to the request, the identifier being allocated as a short uniform resource identifier (URI) comprising:
      (a) the internet address of the payments adviser computer system and a unique location for the financial document, and
      (b) a character length within an available character limit imposed by the payments clearance computer system to be used by the payer's financial institution's computer system;
   the payer's computer system at or after the time of the request, uploading over the internet:
      the financial document to the payments adviser computer system for storage per the identifier, and
      payment account details of the payee;
   the payer's computer system sending to the payer's financial institution's computer system for sending to the payee's computer system through the payments clearance computer system:
      a payment request; and
      a payment reference containing or consisting of the identifier and which signifies to the payee the location to access the financial document;
   on authorization of the payment request, the payer's financial institution's computer system sending via the payments clearance computer system to the payee's financial institution's computer system:

the payment; and
the payment reference containing or consisting of the identifier and which signifies to the payee the location to access the financial document;
the payments clearance computer system sending to the payee's financial institution's computer system:
the payment; and
the payment reference containing or consisting of the identifier and which signifies to the payee the location to access the financial document;
the payee's financial institution's computer system creating a payment advice or bank statement accessible to the payee containing information received via the payments clearance computer system from the payer's financial institution's computer system including the identifier, and
the payee's computer system sending a request over the internet to the payment adviser system which includes the identifier to access the stored financial document applicable to the payment received by the payee from the payer,
wherein the payments adviser computer system uses the document reference code received from the payee computer system as a key to check if the document reference code exists in the document data warehouse, if it is valid the payments adviser computer system will request the payee's computer system to provide the payee's payment account details, on receipt of the payee's payment account details the payments adviser computer system will compare this information with the payment account details of the payee uploaded by the payer, and will retrieve the financial document corresponding to the document reference code and transmit the financial document to the payee computer system.

58. A process for facilitating commerce by identifying a payment received by a payee from a payer, as claimed in claim 57 wherein the payer's computer system additionally uploads over the internet to the payments adviser computer system security authentication information known to both the payer and payee.

59. A process for use by a computer system of a payer and a computer system of a payee in connection with:
a payments adviser computer system comprising computer software executing on computer hardware remote from the computer systems of the payer and payee and communicable over the internet, and which includes a payer registration process, a payer document and upload process and a payee document access process,
the payer registration process stores the payer's details including a password to enable a payer to logon to the payment adviser computer system,
the payer document upload process includes a logon authentication function, a document upload process, and a document data warehouse,
the payee document access process has a document access sub-system, a payment account authentication function, and a document display and download function,
a payments clearance computer system comprising computer software executing on computer hardware remote from the computer systems of the payer and payee and which hardware includes a payer's financial institution's computer system and a payee's financial institution's computer system,
the process comprising:
storing on the payer's computer system for subsequent upload a financial document relating to a payment to a payee,
the payer's computer system logging on via the internet to the payment adviser computer system and entering a password to access the payer document and upload system, uploading and storing on the payment adviser computer system (a) the financial document for subsequent access by a payee, and (b) the payee's payment account details;
the payment adviser system storing the financial document in response to the request, with an identifier in the form of a short uniform resource identifier (URI) comprising (a) the internet address of the payment adviser computer system and a unique location for the financial document, and (b) a character length within an available character limit imposed by the payments clearance computer system to be used by the payer's financial institution's computer system;
the payer's computer system uploading over the internet the financial document to the payments adviser computer system for storage per the identifier;
the payer's computer system sending to the payer's financial institution's computer system for sending to the payee's computer system through the payments clearance computer system:
a payment request corresponding to the financial document; and
the payment reference containing or consisting of the identifier and which signifies to the payee the location to access the financial document;
on authorization of the payment request, the payer's financial institution's computer system sending via the payment clearance computer system to the payee's financial institution's computer system;
the payment; and
the payment reference containing or consisting of the identifier and which signifies to the payee the location to access the financial document;
the payee's financial institution's computer system creating a payment advice or bank statement accessible to the payee containing information received via the payments clearance computer system from the payer's financial institution's computer system including the identifier, and
the payee's computer system sending a request over the internet to the payment adviser system to access the stored financial document applicable to the payment received by the payee from the payer, by entering the short URI into an internet browser,
on receiving the request from the payee's computer system, the payment adviser system executes the document access sub-system and requests the payee's computer system to enter at least the payee's payment account details, if this information matches the stored payment account details entered by the payer, then the document access sub-system displays the stored financial document to the payee's computer system.

60. The process as claimed in claim 59 in which the unique location is less than or equal to ten (10) characters in length.

61. The process as claimed in claim 60, in which the payee's computer system is allowed access to the financial document only on the production of security authentication information to the payments adviser system.

62. The process as claimed in claim 59, in which the security authentication information further comprises at least one of:
   the payment date;
   the payment amount; and
   a secret shared secret between the payer and payee.

63. The process as claimed in claim 59, in which payer registration is required with the payment adviser computer system before the payer's computer system can send a request over the internet to the payments adviser system for an identifier for a financial document.

64. The process as claimed in claim 59, further comprising:
   before a payment is sent to the payee's computer system through the payments clearance system, the payee's computer system sending, directly or indirectly, by computer, a financial document to the payer.

65. A process for use by a computer system of a payer and a computer system of a payee in connection with:
   a payments adviser computer system comprising computer software executing on computer hardware remote from the computer systems of the payer and payee and communicable over the internet, and which includes a payer registration process, a payer document and upload process and a payee document access process,
   the payer registration process capable of storing the payer's details including a password to enable a payer to logon to the payment adviser computer system,
   the payer document upload process includes a logon authentication function, a document upload process, and a document data warehouse,
   the payee document access process has a document access sub-system, a payment account authentication function, and a document display and download function,
   a payments clearance computer system comprising computer software executing on computer hardware remote from the computer systems of the payer and payee and which hardware includes a payer's financial institution's computer system and a payee's financial institution's computer system, the process comprising:
   as a preliminary step, the payer's computer system logging on via the internet to the payment adviser computer system and accessing the payer registration process to store payer's details including a password to enable a payer to logon to the payment adviser computer system,
   subsequently:
   storing on the payer's computer system for subsequent upload a financial document a financial document describing a payment transaction from the payer to the payee and what the funds are for,
   the payer's computer system logging on via the internet to the payment adviser computer system and entering the password to access the payer document and upload system,
   the payer's computer system then sending a request to the payer document and upload system for an identifier for the financial document;
   the payer document and upload system allocating an identifier to the financial document in response to the request, the identifier being allocated as a short uniform resource identifier (URI) comprising (a) the internet address of the payments adviser computer system and a unique location for the financial document, and (b) a character length within an available character limit imposed by the payments clearance computer system to be used by the payer's financial institution's computer system;
   the payer's computer system at or after the time of the request, uploading over the internet (a) the stored financial document for subsequent access by a payee, and (b) security authentication information needed by the payee including the payee's payment account details; to the payer document and upload system for storage in the document data warehouse per the identifier;
   the payer's computer system sending to the payer's financial institution's computer system for sending to the payee's computer system through the payments clearance computer system:
      an electronic payment request corresponding to the financial document; and
      the payment reference containing or consisting of the identifier and which signifies to the payee the location to access the financial document;
   on authorization of the payment request, the payer's financial institution's computer system sending via the payments clearance computer system to the payee's financial institution's computer system:
      the payment; and
      the payment reference containing or consisting of the identifier and which signifies to the payee the location to access the financial document;
   the payments clearance computer system sending to the payee's financial institution's computer system:
      the payment; and
      the payment reference containing or consisting of the identifier and which signifies to the payee the location to access the financial document;
   the payee's financial institution's computer system creating a payment advice or bank statement accessible to the payee containing information received via the payments clearance computer system from the payer's financial institution's computer system including the identifier, and
   the payee's computer system sending a request over the internet to the payment adviser system to access the stored financial document applicable to the payment received by the payee from the payer, by entering the short URI into an internet browser,
   on receiving the request from the payee's computer system, the payment adviser system executes the document access sub-system and requests the payee's computer system to enter at least the payee's payment account details, if this information matches the stored payment account details entered by the payer, then the document access sub-system displays the stored financial document to the payee's computer system.

66. The process as claimed in claim 65, in which the payee's computer system is allowed access to the financial document only on the production of security authentication information to document access subsystem which matches the security authentication information uploaded by the payer for the payee.

67. The process as claimed in claim 66, in which the security authentication information uploaded by the payer for the payee further comprises at least one of:
   the payment date;
   the payment amount; and
   a secret shared secret between the payer and payee.

68. The process as claimed in claim 65, further comprising: before a payment is sent to the payee's computer system through the payments clearance system, the payee's computer system sending, directly or indirectly, by computer, a financial document to the payer.

69. A process for transferring payment information from a payer's computer system to a payee's computer system in conjunction with an electronic payment from the payer to the payee via a secure payment clearance system where the payer can make a selection of invoices to be included in a payment by selecting from a plurality of invoices from the payee in connection with:

a payments adviser computer system comprising computer software executing on computer hardware remote from the computer systems of the payer and payee and communicable over the internet; and a payments clearance computer system comprising computer software executing on computer hardware remote from the computer systems of the payer and payee and which hardware includes a payer's financial institution's computer system and a payee's financial institution's computer system, the process comprising:

the payer selecting from the plurality of invoices from the payee, a selection of invoices to be paid to the payee, the payer preparing a financial document in electronic form relating to a proposed payment instruction comprising a list of the selected invoices to be paid and storing it on the payer's computer system ready for upload, the payer's computer system sending a request over the internet to the payments adviser computer system for an identifier for the financial document;

in response to the request, the payments adviser computer system allocating an identifier to the financial document, the identifier being allocated as a short uniform resource identifier (URI) comprising:
  (a) the internet address of the payments adviser computer system and a unique location for the financial document, and
  (b) a character length within an available character limit imposed by the payments clearance computer system to be used by the payer's financial institution's computer system;

the payer's computer system at or after the time of the request, uploading over the internet the financial document to the payments adviser computer system for storage per the identifier;

the payer's computer system sending to the payer's financial institution's computer system for sending to the payee's computer system through the payments clearance computer system:
  a payment request corresponding to the financial document; and
  a payment reference containing or consisting of the identifier and which signifies to the payee the location to access the financial document;

on authorization of the payment request, the payer's financial institution's computer system sending via the payments clearance computer system to the payee's financial institution's computer system:
  the payment; and
  the payment reference containing or consisting of the identifier and which signifies to the payee the location to access the financial document;

the payments clearance computer system sending to the payee's financial institution's computer system:
  the payment; and
  the payment reference containing or consisting of the identifier and which signifies to the payee the location to access the financial document;

the payee's financial institution's computer system creating a payment advice or bank statement accessible to the payee containing information received via the payments clearance computer system from the payer's financial institution's computer system including the identifier, the payee's computer system sending a request over the internet to the payments adviser computer system which includes the identifier to access the stored financial document applicable to the payment received by the payee from the payer, and the payee viewing the financial document and applying the payment to the selected invoices.

70. A process for transferring payment information from a payer's computer system to a payee's computer system in conjunction with an electronic payment from the payer to the payee via a secure payment clearance system where the payer can make a selection of invoices to be included in a payment by selecting from a plurality of invoices from the payee in connection with:

a payments adviser computer system comprising computer software executing on computer hardware remote from the computer systems of the payer and payee and communicable over the internet; and a payments clearance computer system comprising computer software executing on computer hardware remote from the computer systems of the payer and payee and which hardware includes a payer's financial institution's computer system and a payee's financial institution's computer system, the process comprising:

the payer selecting from the plurality of invoices from the payee, a selection of invoices to be paid to the payee, the payer preparing a financial document in electronic form relating to a proposed payment instruction comprising a list of the selected invoices to be paid and storing it on the payer's computer system ready for upload, the payer's computer system sending a request over the internet to the payments adviser computer system for an identifier for the financial document;

in response to the request, the payments adviser computer system allocating an identifier to the financial document, the identifier being allocated as a short uniform resource identifier (URI) comprising:
  (a) the internet address of the payments adviser computer system and a unique location for the financial document, and
  (b) a character length within an available character limit imposed by the payments clearance computer system to be used by the payer's financial institution's computer system;

the payer's computer system at or after the time of the request, uploading over the internet:
  (i) the financial document to the payments adviser computer system for storage per the identifier, and
  (ii) payment account details of the payee;

the payer's computer system sending to the payer's financial institution's computer system for sending to the payee's computer system through the payments clearance computer system:
  a payment request corresponding to the financial document; and a payment reference containing or consisting of the identifier and which signifies to the payee the location to access the financial document;

on authorization of the payment request, the payer's financial institution's computer system sending via the payments clearance computer system to the payee's financial institution's computer system:
the payment; and
the payment reference containing or consisting of the identifier and which signifies to the payee the location to access the financial document;

the payments clearance computer system sending to the payee's financial institution's computer system:
the payment; and
the payment reference containing or consisting of the identifier and which signifies to the payee the location to access the financial document;

the payee's financial institution's computer system creating a payment advice or bank statement accessible to the payee containing information received via the payments clearance computer system from the payer's financial institution's computer system including the identifier;

the payee's computer system sending a request over the internet to the payments adviser computer system which includes:
(i) the identifier to access the stored financial document applicable to the payment received by the payee from the payer, and
(ii) the payment account details of the payee;

if the information matches that stored in the payment adviser computer system then allowing the payee to view the financial document; and the payee then applying the payment received from the payer to the selected invoices.

71. A payment system that facilitates an electronic payment via a clearance system having a limited communication bandwidth between a payer and payee comprising:
a processing component configured to:
generate a payment identifier that includes a storage location for a financial document associated with the electronic payment such that the electronic payment along with the payment identifier are within the limited communication bandwidth of the clearance system;
receive from the payer an instruction to pay the electronic fund payment; and
coordinate sending of the electronic payment to the payee such that the electronic payment is sent along with the payment identifier to the payee in the limited communication bandwidth of the clearance system; and
a memory component configured to:
receive the financial document from the payer and store the financial document at the storage location; and
permit access to the stored financial document by the payee based on the payment identifier received with the electronic payment.

72. A method of using a payment system that facilitates an electronic payment via a clearance system having a limited communication bandwidth between a payer and payee comprising:
a processing component of the payment system:
generating a payment identifier that includes a storage location for a financial document associated with the electronic payment such that the electronic payment along with the payment identifier are within the limited communication bandwidth of the clearance system;
receiving from the payer an instruction to pay the electronic payment; and
coordinating sending of the electronic payment to the payee such that the electronic fund payment is sent along with the payment identifier to the payee in the limited communication bandwidth of the clearance system; and
a memory component of the payment system:
receiving the financial document from the payer and storing the financial document at the storage location; and
permitting access to the stored financial document by the payee based on the payment identifier received with the electronic payment.

* * * * *